United States Patent
Ramachandran et al.

(10) Patent No.: US 9,260,669 B2
(45) Date of Patent: Feb. 16, 2016

(54) SYNERGISTIC H2S/MERCAPTAN SCAVENGERS USING GLYOXAL

(75) Inventors: Sunder Ramachandran, Sugar Land, TX (US); Vladimir Jovancicevic, Richmond, TX (US); Kyle C. Cattanach, Sugar Land, TX (US); Michael P. Squicciarini, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 581 days.

(21) Appl. No.: 13/408,657

(22) Filed: Feb. 29, 2012

(65) Prior Publication Data

US 2012/0241361 A1 Sep. 27, 2012

Related U.S. Application Data

(60) Provisional application No. 61/467,116, filed on Mar. 24, 2011.

(51) Int. Cl.
*C10G 29/24* (2006.01)
*C10G 19/02* (2006.01)
(Continued)

(52) U.S. Cl.
CPC . *C10G 29/24* (2013.01); *C09K 8/52* (2013.01); *C10G 19/02* (2013.01); *C10G 29/04* (2013.01); *C10G 29/06* (2013.01); *C10G 29/20* (2013.01); *C10G 29/22* (2013.01);
(Continued)

(58) Field of Classification Search
CPC ........ C10G 29/24; C10G 19/02; C10G 29/06; C10G 29/20; C10G 29/22; C10G 29/04; C10G 2300/202; C10G 2300/207; C09K 8/52; C09K 2208/20

USPC ........... 208/232, 230, 231, 240; 252/189, 192
See application file for complete search history.

(56) References Cited

U.S. PATENT DOCUMENTS 1,991,765 A 2/1935 Marks
4,680,127 A 7/1987 Edmondson
(Continued)

FOREIGN PATENT DOCUMENTS

CN 1639299 A 7/2005
CN 101316915 A 12/2008
CN 101507932 A 8/2009

OTHER PUBLICATIONS

Von Halaze et al., "H2S Scavenger auf Glyoxal Basis bei der Erdol- und Erdgasaufbereitung," 107 Jahrgang heft 5 pp. 215-220 (May 1991).
(Continued)

*Primary Examiner* — Randy Boyer
*Assistant Examiner* — Juan Valencia
(74) *Attorney, Agent, or Firm* — Mossman Kumar & Tyler PC

(57) ABSTRACT

The use of neutral aqueous solutions of glyoxal (pH approximately 6 to 8.5) scavenges $H_2S$ that is present in natural gas and in oil better than glyoxal alone or base alone. The resulting scavenger combination significantly increases the reaction rate and the overall scavenging efficiency, i.e. capacity over glyoxal used alone. A buffer may be optionally used. In another embodiment, the combination of non-nitrogen-containing surfactants and glyoxal results in a significant increase in the reaction rate and the overall scavenging efficiency, i.e. capacity as compared to glyoxal used alone.

18 Claims, 3 Drawing Sheets

(51) Int. Cl.
*C10G 29/04* (2006.01)
*C10G 29/06* (2006.01)
*C10G 29/20* (2006.01)
*C10G 29/22* (2006.01)
*C09K 8/52* (2006.01)

(52) U.S. Cl.
CPC ..... *C09K 2208/20* (2013.01); *C10G 2300/202* (2013.01); *C10G 2300/207* (2013.01)

(56) References Cited

U.S. PATENT DOCUMENTS

| | | | |
|---|---|---|---|
| 4,758,371 A * | 7/1988 | Bhatia et al. | 252/192 |
| 5,085,842 A | 2/1992 | Porz et al. | |
| 5,152,916 A | 10/1992 | Hoffmann et al. | |
| 5,284,635 A * | 2/1994 | Frederic | 423/226 |
| 6,306,288 B1 | 10/2001 | Pittman et al. | |
| 7,615,516 B2 | 11/2009 | Yang et al. | |
| 2002/0011447 A1* | 1/2002 | Waldmann | 210/666 |
| 2006/0006121 A1 | 1/2006 | Simpson et al. | |
| 2008/0056971 A1 | 3/2008 | Hughes | |
| 2010/0160186 A1* | 6/2010 | Yang et al. | 507/90 |
| 2012/0067782 A1* | 3/2012 | Kaplan et al. | 208/240 |

OTHER PUBLICATIONS

First action in Chinese Application No. 201280014804.6, dtd. Sep. 26, 2014 (includes Translation).

* cited by examiner

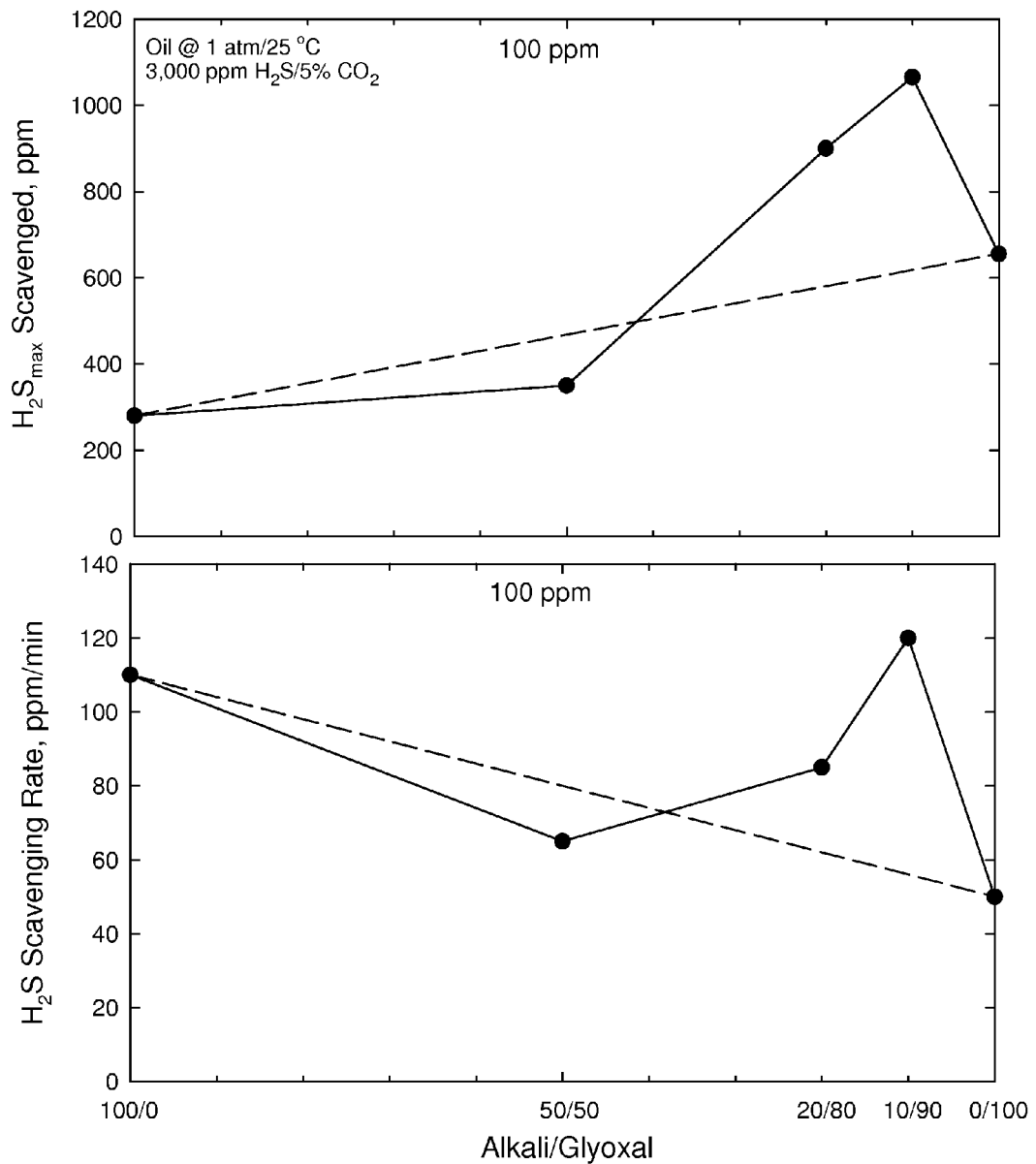

SYNERGISTIC H2S/MERCAPTAN SCAVENGERS USING GLYOXAL

CROSS-REFERENCE TO RELATED APPLICATION

This application claims the benefit of U.S. provisional patent application Ser. No. 61/467,116 filed Mar. 24, 2011, which is incorporated herein by reference in its entirety.

TECHNICAL FIELD

The present invention relates to methods and compositions for scavenging $H_2S$ and/or mercaptans from fluids, and more particularly relates, in one non-limiting embodiment, to methods and compositions for scavenging $H_2S$ and/or mercaptans from fluids using glyoxal and a base and/or a non-nitrogen surfactant.

TECHNICAL BACKGROUND

In the drilling, downhole completion, production, transport, storage, and processing of crude oil and natural gas, including waste water associated with crude oil and gas production, and in the storage of residual fuel oil, $H_2S$ and/or mercaptans are often encountered. The presence of $H_2S$ and mercaptans is objectionable because they often react with other hydrocarbons or fuel system components. Another reason that the $H_2S$ and mercaptans are objectionable is that they are often highly corrosive. Still another reason that $H_2S$ and mercaptans are undesirable is that they have highly noxious odors. The odors resulting from $H_2S$ and mercaptans are detectable by the human nose at comparatively low concentrations and are well known. For example, mercaptans are used to odorize natural gas and used as a repellant by skunks and other animals.

The predominant $H_2S$ and mercaptan scavengers for natural gas and crude oil are monoethanolamine (MEA) triazines and monomethylamine (MMA) triazines. These compounds contain nitrogen and when used in sufficient concentration can cause problems for certain refineries. There have been instances where operators have required the use of a non-nitrogen containing $H_2S$ scavenger. Glyoxal ($C_2H_2O_2$) or acrolein ($C_3H_4O$) has been used as $H_2S$ scavengers in these instances. Glyoxal is a slow acting scavenger and may be corrosive to mild steel. Acrolein is effective scavenger but an extremely toxic substance which operators do not like to use.

It would be desirable if a new non-nitrogen-containing $H_2S$ and mercaptan scavenger could be discovered which is very effective, but which overcomes the deficiencies of prior scavengers.

SUMMARY

There is provided in one non-limiting embodiment a composition for synergistically scavenging hydrogen sulfide and/or mercaptans from a fluid, where the composition includes dialdehyde, a base, a non-nitrogen-containing surfactant and optionally a buffer.

There is additionally provided in one non-restrictive version, a method for scavenging hydrogen sulfide and/or mercaptans from a fluid that includes, but is not necessarily limited to, an aqueous phase, a gaseous phase, a hydrocarbon phase and mixtures thereof. The method involves contacting the fluid with a composition in an effective amount for synergistically scavenging hydrogen sulfide and/or mercaptans. The composition comprises at least one dialdehyde, and second component that is at least one base and/or at least one non-nitrogen-containing surfactant. The amount of hydrogen sulfide and/or mercaptans scavenged is greater as compared with a composition having a greater amount of dialdehyde where the base is absent.

There is further provided in one non-restrictive version, a method for scavenging hydrogen sulfide and/or mercaptans from a fluid that includes, but is not necessarily limited to, an aqueous phase, a gaseous phase, a hydrocarbon phase and mixtures thereof. The method involves contacting the fluid with a composition in an effective amount for synergistically scavenging hydrogen sulfide and/or mercaptans. The composition comprises at least one dialdehyde, and at least one base (in the absence of the non-nitrogen-containing surfactant). The amount of hydrogen sulfide and/or mercaptans scavenged is greater as compared with a composition having a greater amount of dialdehyde where the base is absent.

Also, there is alternatively provided in a non-limiting embodiment a method for scavenging hydrogen sulfide and/or mercaptans from a fluid that includes, but is not necessarily limited to, an aqueous phase, a gaseous phase, a hydrocarbon phase and mixtures thereof. The method involves contacting the fluid with a composition in an effective amount for synergistically scavenging hydrogen sulfide and/or mercaptans, where the composition includes at least one dialdehyde, and at least one non-nitrogen-containing surfactant (in the absence of at least one base), where the amount of hydrogen sulfide and/or mercaptans scavenged is greater as compared with a composition having a greater amount of dialdehyde where the non-nitrogen-containing surfactant is absent.

Any of these methods may optionally include corrosion inhibitors such as phosphate esters, sulfur-oxygen phosphates or polyphosphate esters and the like.

BRIEF DESCRIPTION OF THE DRAWINGS

FIG. 2 is a graph showing the results of a $H_2S$ uptake test showing maximum H2S scavenged as a function of various weight ratios of alkali (KOH)/glyoxal at 1 atmosphere (0.1 MPa) and 25° C. where the oil contained 3000 ppm $H_2S$ and 5% $CO_2$;

FIG. 3 is graph showing $H_2S$ scavenging rates as a function of various weight ratios of alkali (KOH)/glyoxal at 1 atmosphere (0.1 MPa) and 25° C. where the oil contained 3000 ppm $H_2S$ and 5% $CO_2$;

DETAILED DESCRIPTION

Figure 1:
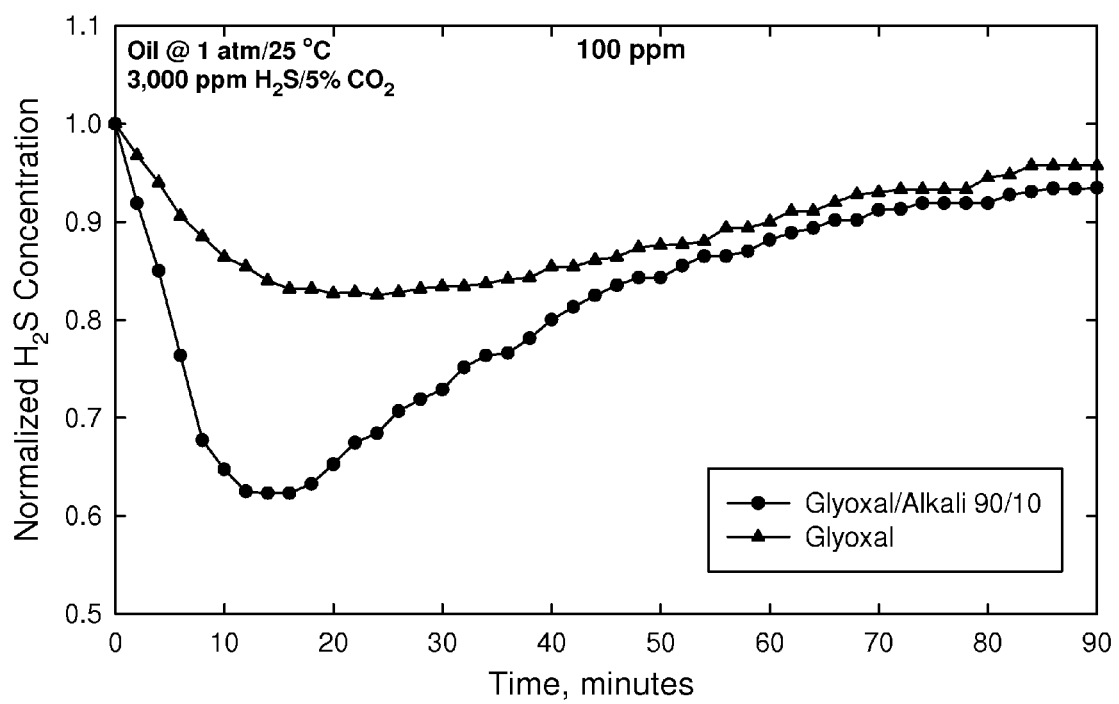
FIG. 1 is a graph of normalized $H_2S$ concentration as a function of time for $H_2S$ scavenged from oil at 1 atmosphere (0.1 MPa) and 25° C. where the oil contained 3000 ppm $H_2S$ and 5% $CO_2$, where H2S scavenger is injected at the beginning of the test and accordingly the normalized H2S concentration becomes lowered; the graph compares glyoxal alone and glyoxal together with alkali (KOH) in a 90/10 weight ratio (glyoxal 40% aqueous solution)

It has been surprisingly discovered that neutral aqueous solutions (about pH 6 to 8.5) of glyoxal based scavenger removes hydrogen sulfide present in natural gas and in oil more completely and faster than glyoxal alone, and is thus also expected to remove mercaptans as well. The process by which the hydrogen sulfide is effectively removed from gas, water or oil involves introducing a synergistic combination of glyoxal and alkaline aqueous solution into the $H_2S$-containing system. The synergistic scavenger combination significantly increases the reaction rate and the overall scavenging efficiency over introducing glyoxal alone. The synergy may be seen from the data discussed below.

In specific applications to remove $H_2S$ from crude oil, the hydrogen sulfide/mercaptan scavenger may be introduced in the crude oil (or other fluid) at concentrations from about 10 independently to about 10,000 ppm, in a different embodiment from about 25 independently to about 7,500 ppm, alternatively from about 50 independently to about 5,000 ppm. The term "independently" when used in connection with a range means that any lower threshold may be combined with any upper threshold to give a valid alternative range.

Glyoxal may be used as an $H_2S$ scavenger in crude oil and other applications where conventional nitrogen-containing compounds (e.g. triazines) may cause corrosion problems in downstream equipment and towers. However, the low pH (pH of approximately 2.5 to 3) of solutions where glyoxal is the only active component may be corrosive to injection pumps and crude oil pipelines. In addition, due to its slow kinetics, the efficiency of glyoxal alone in these applications is significantly lower than the expected theoretical values (2 mol $H_2S$/3 mol glyoxal). The new scavenger composition offers significantly enhanced kinetics and improved efficiency due to a strong synergistic effect between glyoxal and alkali solutions in neutral pH range (about 6 to about 8.5).

Besides glyoxal, other dialdehydes expected to be useful in the method described herein include, but are not necessarily limited to, malondialdehyde, succindialdehyde, glutaraldehyde, and the like, and combinations thereof.

Useful alkali compounds or bases expected to be useful in the method described herein include, but are not necessarily limited to, sodium hydroxide (NaOH), potassium hydroxide (KOH), barium hydroxide ($Ba(OH)_2$), cesium hydroxide (CsOH), strontium hydroxide ($Sr(OH)_2$), calcium hydroxide ($Ca(OH)_2$), ammonium hydroxide ($NH_4OH$), lithium hydroxide (LiOH) and the like and combinations thereof.

In one non-limiting embodiment, sufficient base is added so that the pH of the composition ranges from about 6 independently to about 8.5; alternatively from about 7 independently to about 8.5; in another non-limiting embodiment from about 7 independently to about 8. Alternatively, the amount of base (e.g. KOH) may range from about 0.5 independently to about 10 wt %, alternatively from about 0.5 wt % independently to about 4 wt % based on the total scavenging composition.

In a different non-restrictive version, the weight ratio of base to dialdehyde ranges from about 15/85 independently to 0.1/99.9, alternatively to 5/95, where the dialdehyde is in a 40 wt % aqueous solution; and in another alternate embodiment the weight ratio may be from about 25/75 independently to 5/95, again where the dialdehyde is in a 40 wt % aqueous solution. The alkaline aqueous solution may be from about 5 to 45 wt %.

In some cases where an aqueous solution of glyoxal (or other dialdehyde) is used together with a base or alkali, the pH will drop over time. Thus, in an optional embodiment, a buffer may be used that helps stabilize the pH. Suitable buffers include, but are not necessarily limited to, sodium bicarbonate, potassium bicarbonate, calcium bicarbonate, ammonium bicarbonate, disodium phosphate, sodium acetate and the like (any neutral buffer) and combinations thereof.

In one non-limiting embodiment, the wt % of dialdehyde (e.g. glyoxal) ranges from about 10 independently to about 90 (again as a 40 wt % aqueous solution), the wt % of buffer ranges from about 1 independently to about 5, and the amount of base is effective so that the composition has a pH in the range from about 6 to about 8.5, based on the total composition; the balance being water or other solvent. In another non-restrictive version, the wt % of dialdehyde (e.g. glyoxal) ranges from about 20 independently to about 60 (again as a 40 wt % aqueous solution) alternatively up to about 50 wt %, the wt % of buffer ranges from about 1 independently to about 2, and the amount of base again is effective so that the composition has a pH in the range from about 6 to about 8.5.

The suitable solvents for the $H_2S$/mercaptan scavenger compositions herein include, but are not necessarily limited to, water, alcohols, glycols and mixtures thereof alone or without water. Suitable alcohols include methanol and ethanol. Ethylene glycol may also be used as a solvent during the winter months for antifreeze purposes. Another solvent may be butyl carbitol.

In an alternative embodiment, the at least one dialdehyde (e.g. glyoxal) may be used together with at least one non-nitrogen-containing surfactant, where the use of a base has been optional. In has been surprisingly discovered that the amount of hydrogen sulfide and/or mercaptans scavenged is greater as compared with an otherwise identical composition with respect to dialdehyde, where the non-nitrogen-containing surfactant is absent. Suitable non-nitrogen-containing surfactants include, but are not necessarily limited to, alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides, and the like, and combinations thereof.

In one non-limiting embodiment, the weight ratio of non-nitrogen-containing surfactant to dialdehyde ranges from about 40/60 independently to 0.1/99.9, and alternatively from about 50/50 independently to about 0.9/99.1, again where the dialdehyde is in a 40 wt % aqueous solution. In another non-restrictive version the weight ratio of non-nitrogen-containing surfactant to dialdehyde ranges from about 15/85 independently to 0.5/99.5, alternatively from about 5/95 independently to about 0.1/99.9.

On the other hand, in the composition the wt % of dialdehyde ranges from about 10 independently to about 90, and alternatively from about 20 independently to about 80, and in another non-restrictive embodiment from 10 independently to about 60 (40 wt % aqueous solution in all cases), and the wt % of non-nitrogen-containing surfactant ranges from about 0.01 independently to about 20 wt %, based on the total scavenger composition. The proportions of one non-restrictive suitable formulation containing all of a base (KOH), a buffer, a dialdehyde (glyoxal) and a non-nitrogen-containing surfactant (ethoxylated C12 alcohol) may be those given in Table I.

TABLE I

Suitable $H_2S$/Scavenging Formulation

| Wt % | Component |
|---|---|
| 4 | base |
| 2 | non-nitrogen surfactant |

TABLE I-continued

Suitable H₂S/Scavenging Formulation

| Wt % | Component |
|---|---|
| 0.5 | sodium bicarbonate |
| 30-40 | glyoxal |

The initial pH of this composition was 8.40. The balance is water.

It has been found that water-based formulations of these compounds act as hydrogen sulfide scavengers when the hydrogen sulfide is present in the aqueous phase, the gaseous phase and a hydrocarbon phase. These methods and compositions may be used to remove hydrogen sulfide present in natural gas produced from natural gas wells. They may also be used to remove hydrogen sulfide from crude oil. Additionally they may be used to remove hydrogen sulfide from brines containing hydrogen sulfide. These compositions and methods provide a non-nitrogen-based $H_2S$ and/or mercaptan scavenger.

The $H_2S$/mercaptan scavengers are expected to be useful in a wide variety of applications, particularly "downstream" and "upstream" applications (downstream of a refinery) including, but not necessarily limited to, residual fuel oil, jet fuel, bunker fuel, asphalt, recovered aqueous streams, as well as mixed production streams, for instance downhole or downstream of wellhead, including, but not limited to scavenging $H_2S$ and mercaptans from production fluids. Another suitable application may be to remove hydrogen sulfide from a hydrogen stream, and the like.

The method may involve scavenging $H_2S$ and/or mercaptans from a fluid including an aqueous phase, a hydrocarbon phase and mixtures thereof. In this embodiment, the compound may be present in the fluid in a concentration from about 10 independently to about 10,000 ppm, alternatively from about 50 independently to about 5,000 ppm, alternatively to about 1000 ppm, and in another non-restrictive version at about 300 ppm. In one non-limiting embodiment the method is practiced in a refinery. The primary applications within a refinery involve hydrocarbon liquid phases and hydrocarbon gaseous phases.

When the method scavenges $H_2S$ and/or mercaptans from a gaseous phase, the method may be practiced by contacting the gaseous phase with droplets of the composition, and/or passing the gaseous phase through the composition, such as by bubbling through a tower. With respect to removing $H_2S$ and/or mercaptans from a gaseous phase, the dialdehyde compound is present in the composition in a concentration of at least 5 vol %, in a different non-limiting embodiment at least 50 vol %, alternatively at least 60 vol %, alternatively at least 70 vol %, alternatively at least 80 vol %, alternatively at least 90 vol %, and alternatively at least 95 vol %.

The scavenging compositions described herein may also include corrosion inhibitors including, but not necessarily limited to, phosphate esters, acetylenic alcohols, fatty acids and/or alkyl-substituted carboxylic acids and anhydrides, sulfur-oxygen phosphates and/or polyphosphate esters, quaternary ammonium salts, imidazolines, mercapto alcohols.

The invention will now be illustrated with respect to certain examples which are not intended to limit the invention in any way but simply to further illustrated it in certain specific embodiments.

EXAMPLE 1

Shown in FIG. 1 is a graph of normalized $H_2S$ concentration as a function of time for $H_2S$ scavenged from oil at 1 atmosphere (0.1 MPa) and 25° C. where the oil contained 3000 ppm $H_2S$ and 5% $CO_2$. The curve for glyoxal alone (40% in aqueous solution; triangles) indicates that the amount of $H_2S$ was reduced to its lowest level at about 18 minutes and then gradually rose as the glyoxal was spent. The curve for glyoxal together with alkali (KOH) in a 90/10 weight ratio (total 100 ppm) (glyoxal 36% aqueous solution) (circles) gave a much greater reduction of $H_2S$, and more rapidly, having a minimum at slightly above 0.6 showing a much greater reduction in $H_2S$ presence as compared with using glyoxal alone. Further, even though the $H_2S$ presence gradually increases after treatment with a composition as described herein, it never approaches the amount when glyoxal is used alone over the time of 90 minutes.

EXAMPLE 2

Shown in FIG. 2 is a graph showing the results of a $H_2S$ uptake test showing the maximum reduction of hydrogen sulfide as a function of various weight ratios of alkali (KOH)/glyoxal (each totaling 100 ppm, where the glyoxal was again 40 wt % in an aqueous solution) at 1 atmosphere (0.1 MPa) and 25° C. where the oil contained 3000 ppm $H_2S$ and 5% $CO_2$ showing $H_2S$ scavenged in ppm. It can be seen here that the best performance is seen with the weight ratio of 10/90. FIG. 3 shows the $H_2S$ scavenging rate in ppm/minute for the same conditions. It may be clearly seen that there was an unexpected peak in $H_2S$ scavenged (FIG. 2) and scavenging rate (FIG. 3) for the weight ratio of alkali/glyoxal of 10/90 as compared with only alkali (left side of FIG. 2 and FIG. 3.) and only glyoxal (right side of FIG. 2 and FIG. 3). The dashed lines in both FIGS. represent what would be expected as a smooth transition from only alkali to only glyoxal (additive effect).

EXAMPLE 3

Figure 4:
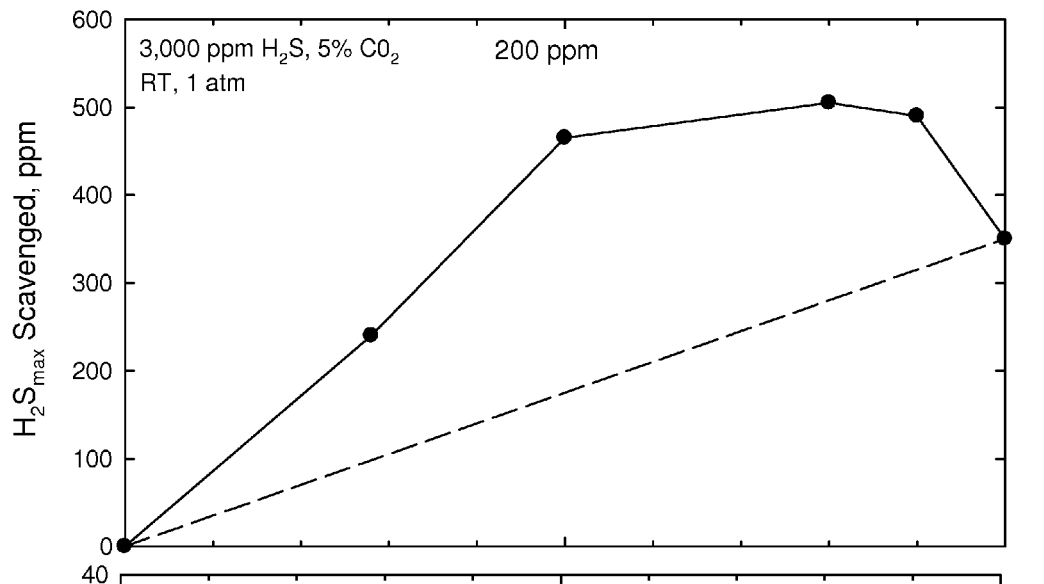
FIG. 4 is a graph showing the results of a $H_2S$ uptake test showing mass uptake as a function of various weight ratios of non-nitrogen-containing surfactant/glyoxal at 1 atmosphere (0.1 MPa) and room temperature where the oil contained 3000 ppm $H_2S$ and 5% $CO_2$.
Figure 5:
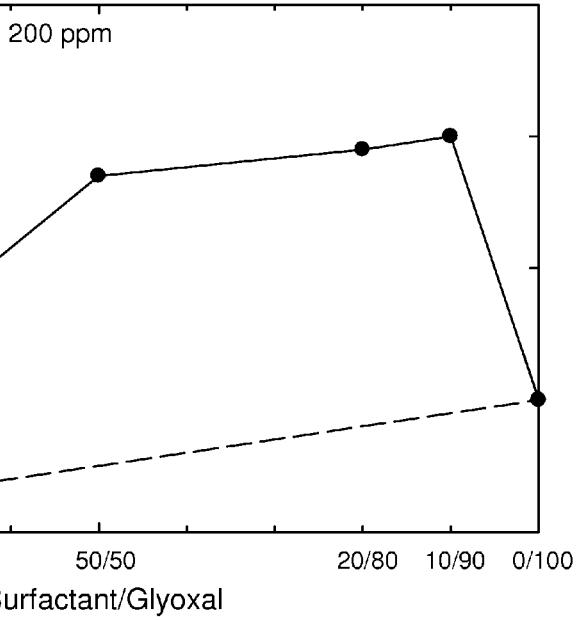
FIG. 5 is graph showing $H_2S$ scavenging rates as a function of various weight ratios of non-nitrogen-containing surfactant/glyoxal at 1 atmosphere (0.1 MPa) and room temperature where the oil contained 3000 ppm $H_2S$ and 5% $CO_2$.

Shown in FIG. 4 is a graph showing the results of a $H_2S$ uptake test showing mass uptake as a function of various weight ratios of non-nitrogen-containing surfactant (ethoxylated C12 alcohol)/glyoxal (each totaling 100 ppm, where the glyoxal was again 40 wt % in an aqueous solution) at 1 atmosphere (0.1 MPa) and 25° C. where the oil contained 3000 ppm $H_2S$ and 5% $CO_2$ showing $H_2S$ scavenged in ppm. In this graph synergistic performance is seen with the different weight ratios that contain non-nitrogen-containing surfactant. FIG. 5 shows the $H_2S$ scavenging rate in ppm/minute for the same conditions. It may be clearly seen that there was an unexpected peak in $H_2S$ scavenged (FIG. 4) at a ratio of surfactant/glyoxal of 20/80 and an unexpected peak in scavenging rate (FIG. 5) for the weight ratio of surfactant/glyoxal of 10/90 as compared with only surfactant (left side of FIGS.) and only glyoxal (right side of FIGS.). The dashed lines in both FIGS. represents what would be expected as a smooth transition from only non-nitrogen-containing surfactant to only glyoxal (additive effect).

In the foregoing specification, the invention has been described with reference to specific embodiments thereof, and has been demonstrated as effective in providing methods and compositions for scavenging $H_2S$ and/or mercaptans from aqueous fluids, hydrocarbon fluids, gaseous phases and/or combinations thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific dialdehydes, non-nitrogencontaining surfactants, buffers and alkalis/bases falling within the claimed parameters, but not specifically identified or tried in a particular composition or method, are expected to be within the scope of this invention.

The words "comprising" and "comprises" as used throughout the claims is interpreted "including but not limited to".

The present invention may suitably comprise, consist or consist essentially of the elements disclosed and may be practiced in the absence of an element not disclosed. For instance, in the method for scavenging hydrogen sulfide and/or mercaptans from a fluid selected from the group consisting of an aqueous phase, a gaseous phase, a hydrocarbon phase and mixtures thereof, the method may consist of, or consist essentially of, contacting the fluid with a composition in an effective amount for scavenging hydrogen sulfide and/or mercaptans, where the composition consists of or consists essentially of at least one dialdehyde, and at least one base; where the amount of hydrogen sulfide and/or mercaptans scavenged is greater as compared with an otherwise identical composition where the base is absent.

Alternatively, in the present method for scavenging hydrogen sulfide and/or mercaptans from a fluid selected from the group consisting of an aqueous phase, a gaseous phase, a hydrocarbon phase and mixtures thereof, the method may consist of or consist essentially of contacting the fluid with a composition in an effective amount for scavenging hydrogen sulfide and/or mercaptans, where the composition consists of, or consists essentially of, at least one dialdehyde, and at least one non-nitrogen-containing surfactant; where the amount of hydrogen sulfide and/or mercaptans scavenged is greater as compared with an otherwise identical composition where the non-nitrogen-containing surfactant is absent.

In another non-limiting embodiment, in the present method for scavenging hydrogen sulfide and/or mercaptans from a fluid selected from the group consisting of an aqueous phase, a gaseous phase, a hydrocarbon phase and mixtures thereof, the method may consist of or consist essentially of contacting the fluid with a composition in an effective amount for scavenging hydrogen sulfide and/or mercaptans, where the composition consists of, or consists essentially of, at least one dialdehyde, at least one base, and at least one non-nitrogen-containing surfactant; where the amount of hydrogen sulfide and/or mercaptans scavenged is greater as compared with an otherwise identical composition where the non-nitrogen-containing surfactant is absent.

Finally, in the composition for scavenging hydrogen sulfide and/or mercaptans from a fluid, the composition may consist of, or consist essentially of, dialdehyde, a base, and a non-nitrogen-containing surfactant.

What is claimed is:

1. A method for scavenging hydrogen sulfide and/or mercaptans from a fluid selected from the group consisting of an aqueous phase, a gaseous phase, a hydrocarbon phase and mixtures thereof, the method comprising contacting the fluid with a composition in an effective amount for synergistically scavenging hydrogen sulfide and/or mercaptans, where the composition consists of:
   at least one dialdehyde,
   at least one base and
   at least one non-nitrogen-containing surfactant; and
   optionally a buffer, and optionally a solvent;
   where synergistically scavenging is defined as the amount of hydrogen sulfide and/or mercaptans scavenged is greater as compared with a composition having a greater amount of dialdehyde where the second component is absent.

2. The method of claim 1 where:
   the dialdehyde is selected from the group consisting of glyoxal, malondialdehyde, succindialdehyde, glutaraldehyde and combinations thereof;
   the base is selected from the group consisting of NaOH, KOH, $Ba(OH)_2$, CsOH, $Sr(OH)_2$, $Ca(OH)_2$, $NH_4OH$, LiOH, and combinations thereof; and
   the non-nitrogen-containing surfactant is selected from the group consisting of alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides and combinations thereof.

3. The method of claim 1 where the composition has a pH in the range from about 6 to about 8.5.

4. The method of claim 1 where the weight ratio of base to dialdehyde ranges from about 25/75 to about 5/95, where the dialdehyde is in a 40 wt % aqueous solution.

5. The method of claim 1 where the composition consists of a buffer selected from the group consisting of sodium bicarbonate, potassium bicarbonate, calcium bicarbonate, ammonium bicarbonate, disodium phosphate, sodium acetate and combinations thereof.

6. The method of claim 5 where in the composition: the wt % of dialdehyde ranges from about 10 to about 90 (40 wt % aqueous solution), the wt % of buffer ranges from about 1 to about 5, and the amount of base is effective so that the composition has a pH in the range from about 6 to about 8.5.

7. The method of claim 1 where the composition is present in the fluid in a concentration from about 10 to about 10,000 ppm.

8. The method of claim 7 where the method is practiced in a refinery.

9. The method of claim 7 where the method is practiced in upstream production.

10. The method of claim 1 where the weight ratio of non-nitrogen-containing surfactant to dialdehyde ranges from about 40/60 to 0.1/99.9, where the dialdehyde is in a 40 wt % aqueous solution.

11. The method of claim 1 where in the composition: the wt % of dialdehyde ranges from about 10 to about 90 (40 wt % aqueous solution), and the wt % of non-nitrogen-containing surfactant ranges from about 0.01 to about 20.

12. The method of claim 1 where the composition comprises an amount of a base effective so that the pH of the composition is in the range from about 6 to about 8.5.

13. The method of claim 12 where the weight ratio of base to dialdehyde ranges from about 15/85 to about 0.1/99.9, where the dialdehyde is in a 40 wt % aqueous solution.

14. The method of claim 12 where the composition consists of a buffer selected from the group consisting of sodium bicarbonate, potassium bicarbonate, calcium bicarbonate, ammonium bicarbonate, disodium phosphate, sodium acetate and combinations thereof.

15. The method of claim 14 where in the composition: the wt % of dialdehyde ranges from about 10 to about 90 (40 wt % aqueous solution), the wt % of buffer ranges from about 1 to about 5, and the amount of base is effective so that the composition has a pH in the range from about 6 to about 8.5.

16. A method for scavenging hydrogen sulfide and/or mercaptans from a fluid selected from the group consisting of an aqueous phase, a gaseous phase, a hydrocarbon phase and mixtures thereof, the method comprising contacting the fluid with a composition in an effective amount for synergistically scavenging hydrogen sulfide and/or mercaptans, where the composition consists of:

at least one dialdehyde, at least one base, and at least one non-nitrogen-containing surfactant;

and optionally a buffer, and optionally a solvent;

where synergistically scavenging is defined as the amount of hydrogen sulfide and/or mercaptans scavenged is greater as compared with a composition having a greater amount of dialdehyde where the base is absent;

and where the composition has a pH in the range from about 6 to about 8.5, and where:

the dialdehyde is selected from the group consisting of glyoxal, malondialdehyde, succindialdehyde, glutaraldehyde and combinations thereof; the base is selected from the group consisting of NaOH, KOH, Ba(OH)2, CsOH, Sr(OH)2, Ca(OH)2, NH4OH, LiOH, and combinations thereof; and the non-nitrogen-containing surfactant is selected from the group consisting of alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides and combinations thereof.

17. The method of claim 1 where the composition consists of a solvent selected from the group consisting of water, an alcohol, a glycol, and combinations thereof.

18. The method of claim 6 where the composition consists of a solvent selected from the group consisting of water, an alcohol, a glycol, and combinations thereof.

* * * * *